United States Patent
Ryan et al.

(10) Patent No.: US 6,564,728 B2
(45) Date of Patent: May 20, 2003

(54) HIGH CLEARANCE SHANK

(75) Inventors: Christopher L. Ryan, Sun Prairie, WI (US); Dean A. Knobloch, Goodfield, IL (US); Paul A. Hurtis, Mackinaw, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/948,151

(22) Filed: Sep. 6, 2001

(65) Prior Publication Data

US 2002/0043382 A1 Apr. 18, 2002

Related U.S. Application Data

(60) Provisional application No. 60/230,672, filed on Sep. 7, 2000.

(51) Int. Cl.[7] .............................................. A01C 23/00
(52) U.S. Cl. ..................... 111/123; 172/710; 172/708; 172/265
(58) Field of Search ................................ 172/705, 706, 172/707, 708, 501, 271, 763, 773, 710, 265; 111/123, 118, 120, 119

(56) References Cited

U.S. PATENT DOCUMENTS

| | | | |
|---|---|---|---|
| 1,068,832 A | 7/1913 | Alsup | |
| 3,098,529 A | 7/1963 | Wade et al. | 172/265 |
| 3,258,076 A | 6/1966 | Groenke | 172/710 |
| 3,700,038 A | 10/1972 | Essex | 172/265 |
| 3,707,132 A | * 12/1972 | Hansen | 111/123 |
| 3,981,367 A | 9/1976 | Mydels | 172/265 |
| 4,011,916 A | * 3/1977 | Neal et al. | 172/705 |
| 4,177,865 A | 12/1979 | Lewison | 172/705 |
| 4,185,699 A | 1/1980 | Lewison | 172/724 |
| 4,193,456 A | * 3/1980 | Ankenman | 172/272 |
| 4,200,157 A | 4/1980 | Anderson | 172/264 |
| 4,210,210 A | * 7/1980 | Ankenman | 172/272 |
| 4,249,615 A | 2/1981 | Friggstad | 172/266 |
| 4,261,423 A | 4/1981 | Williamsom | 172/705 |
| 4,461,358 A | * 7/1984 | Lewison | 172/705 |
| 4,463,813 A | 8/1984 | Long et al. | 172/705 |
| 4,502,548 A | 3/1985 | Griffin | 172/705 |
| 4,520,878 A | 6/1985 | Smith et al. | 172/705 |
| 4,548,277 A | * 10/1985 | Dietrich et al. | 172/265 |
| 4,596,199 A | 6/1986 | Dietrich, Sr. et al. | 111/7 |
| 4,699,221 A | * 10/1987 | Malinowski et al. | 172/265 |
| 4,700,785 A | * 10/1987 | Bartusek et al. | 111/84 |
| 4,723,495 A | 2/1988 | Dietrich, Sr. et al. | 111/85 |
| 4,730,678 A | * 3/1988 | Denis et al. | 172/265 |
| 5,165,486 A | * 11/1992 | Davidson | 172/499 |
| 5,427,183 A | 6/1995 | Parker | 172/265 |
| 5,787,992 A | 8/1998 | Dobson et al. | 172/264 |
| 6,012,534 A | 1/2000 | Kovach et al. | 172/196 |

OTHER PUBLICATIONS

Product Brochure—Series 400 Sunflower Deep Tillage p. 8.

* cited by examiner

*Primary Examiner*—Victor Batson
(74) *Attorney, Agent, or Firm*—Rebecca Henkel

(57) ABSTRACT

An automatic spring-reset shank for agricultural use has a high retaining force and an improved trip clearance. The field use position of the shank is defined by a saddle in the mount weldment. The raised position of the shank is defined by the upper edge of a slot in a vertical guide plate for the shank assembly, located in the mounting weldment. The shank assembly pivots about a location which is below and forward of the transverse frame member or toolbar to which it is mounted. The action line of the spring is located at an angle of approximately 65° above the horizontal, and it is inclined rearwardly and upwardly, never crossing the horizontal axis (i.e., center) of the main pivot.

15 Claims, 3 Drawing Sheets

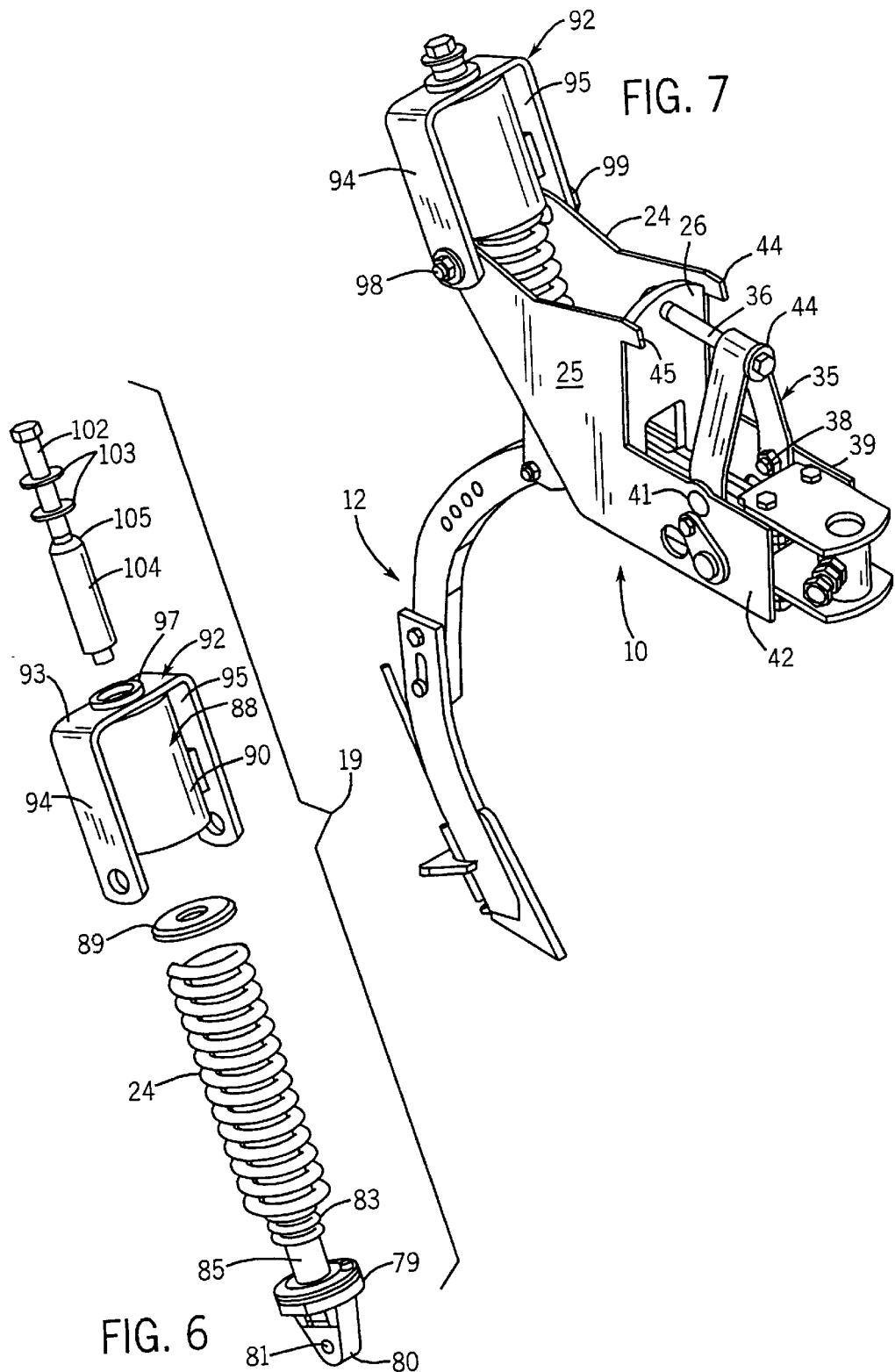

HIGH CLEARANCE SHANK

RELATED APPLICATION

This application claims the benefit of the filing date of provisional application No. 60/230,672, filed Sep. 7, 2000 now abandoned.

FIELD OF THE INVENTION

The present invention relates to agricultural ground-engaging tools; and more particularly, to an automatic spring reset shank for a ground-working tool, such as a fertilizer applicator unit.

BACKGROUND OF THE INVENTION

There have been attempts to provide fertilizer shanks with automatic reset features using springs to apply an initial preset force resisting any movement of the shank from the field working position. The preset force is generated through a predetermined preload on the reset spring. Once the preset force is overcome, such as when the shank encounters a bolder or other rigid object, the shank pivots upwardly and rearwardly in an effort to clear the obstruction. The reset spring compresses, applying an increased reset force. Eventually, however, the reset force reaches a maximum as the shank rises; and further displacement of the shank creates a reduced reset force, thereby facilitating clearance of the object. This characteristic is known in the art and is referred to as a parabolic force curve. Upward displacement of the shank is commonly referred to as tripping. The horizontal force required to induce tripping is referred to as the trip force.

One such attempt at providing an automatic reset force having a parabolic force/displacement characteristic is described in U.S. Pat. No. 4,463,813. The design in the '813 patent, however, has a number of structural characteristics upon which the present invention improves. For example, in the '813 patent, the depth of the shank is controlled through adjustment of a spring tension bolt, in an effort to alleviate unnecessary stress on the mount when the shank is in the working position. Moreover, the design of the '813 patent uses intricate, expensive castings to mount and compress the reset spring. Furthermore, the maximum trip position of the shank in the '813 patent is controlled by means of a spring compression casting. The casting includes a stop member which extends from the main pivot of the shank. In addition, the reset spring of the prior art design is oriented approximately 20° beneath the horizontal and extends downwardly and rearwardly relative to the main spring pivot which is mounted to a bracket mounted on the main transverse frame member to which the shank assembly is mounted.

SUMMARY OF THE INVENTION

The present invention includes a shank pivot weldment which carries the shank and knife assembly, and is pivotally mounted to a mount weldment. The mount weldment is releasably mounted to a toolbar or transverse frame member of the implement carrying the tools. The present invention is disclosed in the context of a fertilizer applicator, but persons skilled in the art will appreciate that the automatic reset feature on the present invention is applicable to other ground-working agricultural tools.

The mount weldment includes an upright guide plate which is mounted flush with the rear vertical surface of the toolbar, and includes a lower slot, opening downwardly, to receive the shank pivot weldment. A plate attached to the mount side plates spanning the distance between side plates located upward and forward of the lower spring mount provides additional strength to the weldment and slot defines the raised or tripped position of the shank assembly by limiting the motion of the shank pivot weldment in the maximum raised position. The lower position of the shank assembly is defined by a saddle carried by side plates of the mount weldment.

The shank assembly is biased to the lowered or field working position by means of a spring assembly. One end of the spring assembly is pivotally mounted to the rear of the shank pivot weldment, and the action line of the spring extends upwardly and rearwardly at about 65° above the horizontal from that lower pivot point of the spring assembly. An upper spring bracket of inverted U-shape mounts the top of the reset spring to the mount weldment and provides an upper spring pivot axis located approximately midway of the length of the spring and intersecting the action line of the spring.

The spring is pre-loaded to provide an initial holding force of approximately 1,000 lbs., and the design of the elements is such that the vertical clearance of the shank is approximately 8 inches.

Other features and advantages of the present invention will be apparent to persons skilled in the art from the following detailed description of the preferred embodiment accompanied by the attached drawing, wherein identical reference will refer to like part in the various views.

BRIEF DESCRIPTION OF THE DRAWING

FIG. 6 is an exploded perspective view of the spring assembly of the shank unit of FIG. 1; and FIG. 7 is an upper, frontal perspective view taken from the right side of the shank unit of FIG. 1.

DETAILED DESCRIPTION OF THE ILLUSTRATED EMBODIMENT

Before discussing the details of the illustrated embodiment, it will be helpful to understand the major structural components and their functions.

Figure 1:
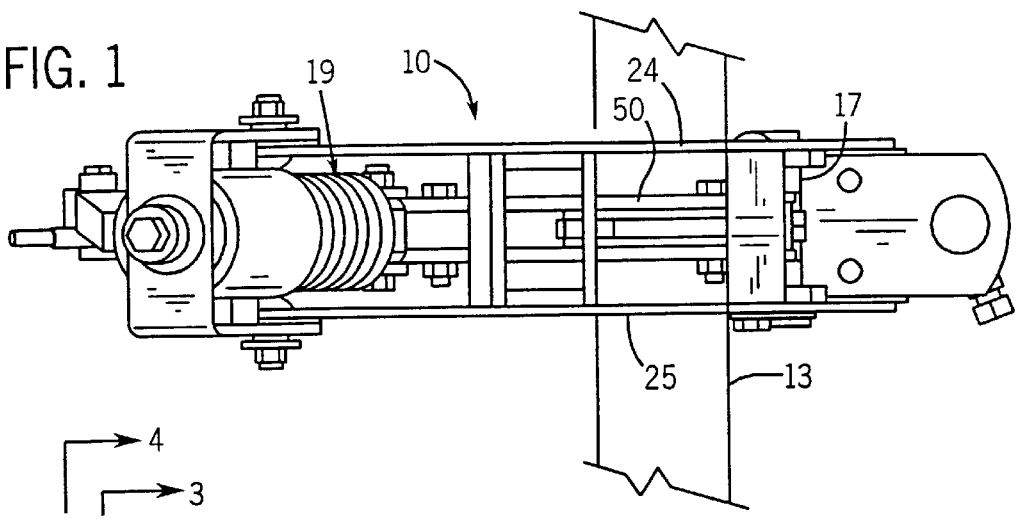
FIG. 1 is a top view of an automatic reset fertilizer shank unit incorporating the present invention.
Figure 4:
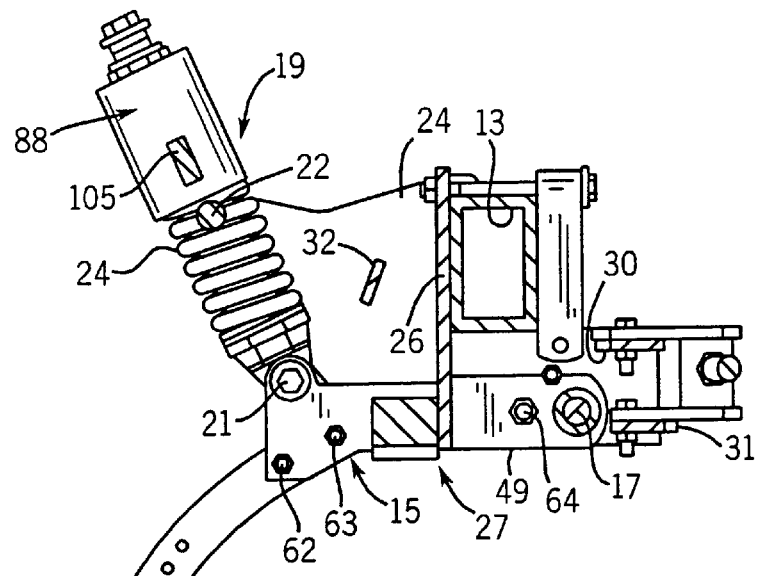
FIG. 4 is a vertical cross-section view of the shank assembly of FIG. 1 taken through the sight line 4—4 of FIG. 1 showing the shank in the ground-engaging or work position.
Figure 5:
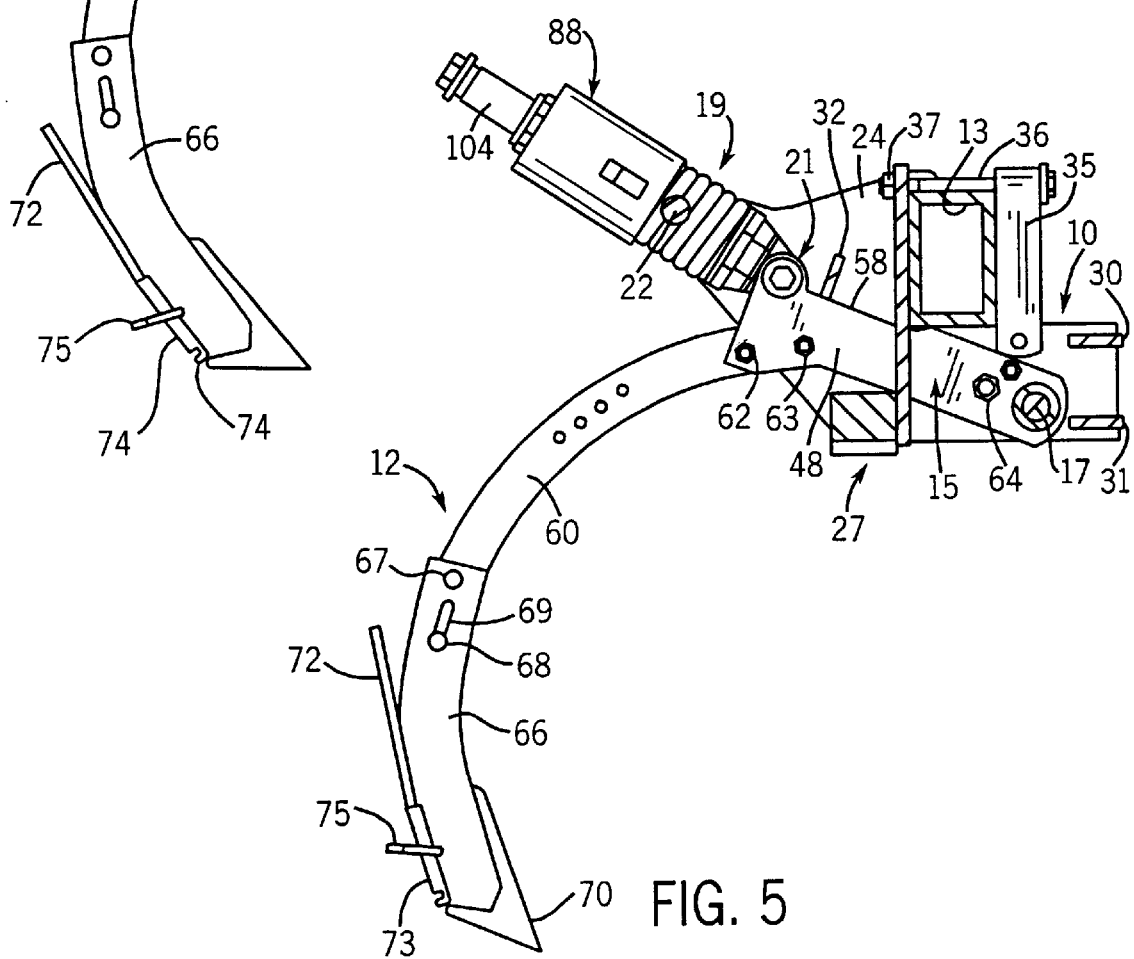
FIG. 5 is a vertical section view through the sight line 4—4 of FIG. 1 showing the shank in the raised or reset position.

Referring to FIGS. 1 and 7, reference numeral 10 generally designates a mounting weldment which mounts a shank assembly generally designated 12 in FIG. 7 to a toolbar designated 13 in FIGS. 4 and 5. As used herein, a toolbar is a transverse frame member of an agricultural implement. In the case of the illustrated embodiment, the toolbar 13 forms a structural frame member of a fertilizer applicator system.

The shank assembly is received in and mounted rigidly to a shank pivot weldment generally designated 15. The shank pivot weldment 15 is pivotally mounted by a bolt 17

(sometimes referred to as the main pivot) to the mounting weldment 10 so that it may rotate between the lowered, ground-engaging or field working position of FIG. 4, and the raised or tripped position of FIG. 5.

A spring assembly generally designated 19 (FIG. 6) has two pivot mountings. A first pivot mounting of the spring assembly, sometimes referred to as the lower or forward pivot mounting of the spring assembly 19, is provided by a pivot bolt 21 in FIGS. 4 and 5, and an upper or rear pivot of the spring assembly is provided by bolts, one of which is seen at 22 in FIGS. 4 and 5. It will be observed that the upper pivot axis of the spring assembly is located at a position which is the approximate mid-point of the spring before compression; and the axis of the upper spring pivot 22 intersects the line of action of the spring which extends along the axis of the helical coil spring 24 which is a part of the spring assembly 19, as will be further described below.

Figure 3:
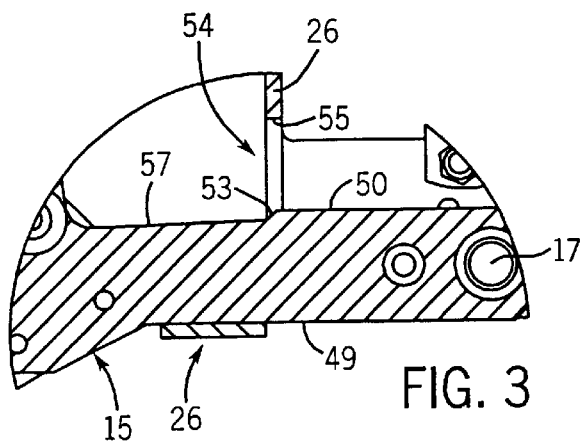
FIG. 3 is a close up sectional view taken along sight line 3—3 of FIG. 2 showing the shank pivot weldment and the structure for limiting the motion of a shank.

Turning now to the mounting weldment 10, it includes a left side plate 24, a right side plate 25, a vertical guide plate 26 which is welded to the side plates 24, 25, and a saddle stop 27, best seen in FIGS. 3–5.

In addition, as seen in FIG. 5, the mounting weldment 10 includes a pair of upper and lower transverse braces 30, 31 located in a forward position, and an intermediate transverse brace 32. The braces 30, 31 and 32 each serve additional functions, but they are welded between the opposing surfaces of the left and right side plates 24, 25 of the mounting weldment 10. In addition, braces 30, 31 carry a conventional swivel accessory mount designated 33 in FIG. 4.

The mounting weldment 10 is mounted to the toolbar 13 by means of a clamp arm generally designated 35 and a bolt 36, the threaded end of which is received through an aperture in the upper part of the guide plate 26 and secured by a nut 37 (FIG. 5).

Figure 2:
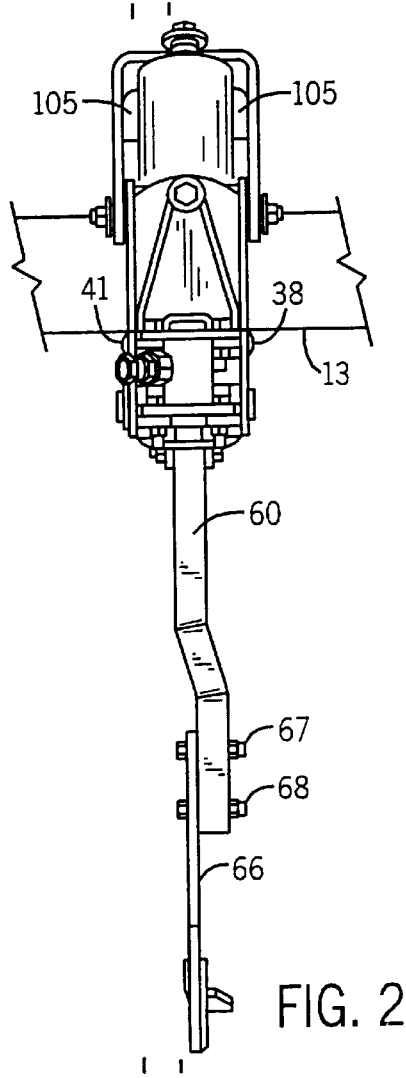
FIG. 2 is a front elevational view of the shank assembly of FIG. 1.

As best seen in FIG. 7, the clamp arm 35 is in the form of a strap which is configured generally in the shape of an inverted V, having a left portion which is bolted at 38 (FIG. 2) to a forward extension 39 of the left side plate 24, and a right depending portion bolted at 41 to a corresponding forward extension 42 of the right side plate 25 of the mounting weldment. A washer 44 supports the head of the bolt 36 to the forward edge of the clamp arm 35.

It will be observed from FIGS. 4 and 5 that the upper edges of the forward extensions 39, 42 of the side mounting plates of the mounting weldment engage the lower surface of the toolbar 13, the forward surface of the guide plate 26 is flush with the rear surface of the toolbar; the rear edge of the clamp arm 35 is flush with the front surface of the toolbar; and the bolt 36 rests on the top surface of the toolbar.

In addition, the left and right side plates 24, 25 are provided at their intermediate sections with forwardly projecting tabs 44, 45 which are spaced above their respective forward extensions 39, 42 to receive the toolbar 13 in snug, but removable engagement.

The guide arm 35 is freely pivotable about the bolts 38, 41 so that when the mounting bolt 36 is removed, it may be pivoted forwardly to open the receptacle formed thereby and receive the toolbar. The weight of the overall shank assembly is at least partially borne by the tabs 44, 45 during mounting, so that one hand is free to pivot the clamp arm 35 to the securing position shown in FIGS. 4 and 5, against the toolbar, and the bolt can then be assembled as shown in FIGS. 4 and 5, projecting through an upper aperture in the guide plate 26, and secured by the nut 37. This structure permits not only a quick and convenient mounting and dismounting of the overall shank structure, but it also permits lateral adjustment without dismounting.

The shank pivot weldment 15 is in the form of a channel, having a right side plate 48, a bottom wall 49, and a left upright wall (see 50 in FIG. 1).

As best seen in FIG. 3, the left and right side of the shank mounting weldment 15 includes an offset such as the one designated 53 in FIG. 3 for the left sidewall 50. The shank mounting weldment extends through a notch 54 formed in the lower, central portion of the guide plate 26. The notch 54 includes an upper edge 55 which serves as a limit for the upper movement of the shank mounting weldment 15 and defines the reset position, as illustrated in FIG. 5. The offset 53 rotates forwardly of the guide plate 26, so that the edge 55 engages the upper surface 57 of the left sidewall 50 and a corresponding, aligned surface on the right sidewall 48, and designated 58 in FIG. 5. The upper motion of the shank pivot weldment 15 is further restrained by the lower surface of the brace 32, which is properly located to engage the shank pivot weldment 15 as seen in FIG. 5, the lower edge of which also engages the surfaces 57, 58 of the left and right side walls of the shank pivot weldment 15.

The shank assembly 12 includes a conventional shank 60 which is bolted to the shank mounting weldment 15 in three locations, designated 62, 63 and 64. The shank 60 is conventional, having a curved shape as seen in FIG. 5, extending rearwardly and downwardly in the field use or ground-working position of FIG. 4. At the bottom of the shank 60 there is mounted a conventional knife holder 66, mounted by an upper bolt 67 which permits pivotal movement between the shank 60 and the knife holder 66, and a shear bolt 68 mounted in a slot 69 on the knife holder 66. This mounting is also conventional. A knife edge 70 is conventionally mounted to the knife holder 66. A fertilizer delivery tube 72 is mounted behind the knife holder 66, secured by a mount 73 providing a lower rearwardly facing discharge aperture. A sealer 75 is also welded to the knife holder 66 to compact soil above the discharge opening of the tube mount 73 to trap the fertilizer, particularly if it is anhydrous ammonia and secured at the desired depth so it does not volatilize and escape.

Turning now to the spring assembly shown in FIG. 6, it includes a mounting lug 79, the lower portion of which defines a tab 80 which is apertured at 81 to receive a mounting bolt (the previously-described pivot bolt 21 seen in FIGS. 4 and 5) to provide the lower pivot for the spring assembly. The upper portion of the lug 79 provides a seat for the previously described spring 24 and an inner spring 83, both of which are received on a spring bolt 85 fixed to the lug 79.

The upper portions of the springs 24, 83 are received in a retainer canister 88 in the form of an open-ended cylinder, which opens downwardly. A casting 89 forming a seat for the upper ends of both the outer spring 24 and inner spring 83 is welded to the inside of the canister. The spring retention canister 88 has a generally cylindrical outer wall 89 which receives the upper portions of the springs 24, 83. Cylindrical wall 90 has an internal circumference only slightly larger than the outer circumference of the spring 24 so as to guide the spring in its compression and expansion cycles and to resist any unintended deformation of the spring.

A mounting bracket of an inverted U-shape 92 includes an upper horizontal portion 93 and depending right and left legs 94, 95. The upper portion 93 of the strap is provided with a central aperture, and the top wall of the canister 88 is provided with a similar aperture aligned with the aperture in the portion 93. A bushing is received in the aligned apertures and the three components as well as the spring casting 89 are welded together to form a rigid weldment. The lower portion of the legs 94, 95 of the mounting bracket 92 are apertured to receive pivot bolts 98, 99 which pivotally mount the legs of the spring bracket 92 through the upper rear extensions of the left and right side plates 24, 25 of the mounting weldment 10, as best seen in FIG. 7.

A bolt 102 and a pair of washers 103, one of which may be a nylon washer to reduce friction, is passed through a wear tube 104, the upper edge of which is chambered at 105, bolt 102 is passed through the bushing 107, and the wear tube 104 is placed on the bolt inside the canister 88. The outer diameter of the wear tube 104 is less than the inner diameter of the bushing 107 so the wear tube rides along the bushing, reducing wear on the spring bolt, guided through the bushing by the chamfer 105. The bottom of the bolt 102 is threaded, and received in the internally-threaded upper end of the spring bolt 85. Spacers 105 are welded between the outer surface of the canister 88 and the arms 94, 95 of the upper spring bracket 92 to strengthen the retention canister weldment.

The springs 24, 83 are compressed to induce a preload urging the shank mount weldment and the shank assembly into the lower, ground-working position of FIG. 4. The initial resistance force is approximately 950 lbs. That is, a draft force of approximately 950 lbs. is required to cause the shank assembly to move rearward. As the shank assembly moves rearward, it pivots about the pin 17 and raises, thereby raising the lower pivot of the spring assembly 19, and reducing the distance between the lower pivot 21 and the upper pivot 22 of the spring assembly. This compresses both springs because the upper ends of the springs are captured by the canister 88 and held at a fixed distance relative to the side plates 24, 25 of the mount weldment 10.

As the deflection of the shank assembly increases, that is, it rotates clockwise about the pivot 17, as viewed from the right side, the line of action of the springs, which is the line passing through the centers of the pivots 21, 22, rotates counterclockwise. Originally, the line of action of the spring as seen in FIG. 4, is approximately 35° rearward from the vertical (65° above the horizontal), and as the deflection increases, the spring rotates counterclockwise about the pivot 22 to the limit position shown in FIG. 5 wherein the shank mounting weldment 15 engages both the edge 55 of the upright guide plate 26 of the mount weldment and the brace 32, as seen in FIG. 5. It will also be observed from FIG. 5 that the line of action of the spring, in the upper limit position shown in FIG. 5, does not cross the axis of the main pivot 17. Therefore, the mechanism does not reach the overcenter position, and the spring continues to urge a force tending to reset the shank assembly once an obstruction has been passed. It will be observed from FIG. 4, the shank weldment 15 rests on the saddle stop 27 to define the working position of FIG. 4.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

What is claimed is:

1. A resetting mechanism for mounting a ground-engaging tool to an agricultural toolbar having a generally upright rear surface, comprising:

a shank carrying said tool;

a toolbar mount mountable to the toolbar and including at least one side plate engaging said toolbar and extending rearwardly thereof;

a first pivot mount carrying said shank and pivotally mounted at a first location to the at least one side plate for rotation from a use position when the tool is in a field use position to a tripped position generally above said use position when the tool engages an obstacle;

a spring assembly including at least one pre-loaded coil spring and having a lower end pivotally mounted to the first pivot mount;

a second pivot mount pivotally mounting said spring assembly to the at least one side plate so as to orient the spring member to de an action line;

at least one member rigidly linked to and extending from the at least one side plate and having a lower edge providing a limit position for the first pivot mount in said tripped position, the member positioned so as to prevent the action line from passing over center of the first pivot location; and a saddle member mounted to and extending from the at least one side plate and extending below the first pivot mount to limit the downward motion of the first pivot mount when the shank is in the field use position.

2. The apparatus of claim 1, wherein the action line defines an included angle with the horizontal in the range of approximately 50 to 80 degrees when the shank is in the use position.

3. The apparatus of claim 2, wherein the action line defines an included angle of approximately 65 degrees with the horizontal.

4. The apparatus of claim 3, further comprising a transverse brace member secured to the at least one side plate and cooperating with the lower edge to engage the toolbar mount in the tripped position.

5. The apparatus of claim 4, wherein the spring assembly includes a second coil spring concentrically mounted within the first coil spring; and further including a spring bolt extending through the first and second coil springs;

a spring holder connected to the upper end of the first and second coil springs and extending downwardly about at least a portion of the coil springs;

a spring mount connected to the spring bolt and providing the pivotal mount of the spring assembly to the first pivot mount;

the springs compressing as the first pivot mount rotates from the use position to the tripped position;

the spring bolt extending Through the springs during compression thereof.

6. The apparatus of claim 5, wherein the shank comprises a shank for a fertilizer applicator, the shank further including a knife at the bottom thereof to form a furrow, and a fertilizer applicator tube extending behind the shank and defining a discharge opening adjacent a rear edge of the knife.

7. The apparatus of claim 1, further comprising a transverse brace member secured to the at least one side plate and cooperating with the lower edge to engage the toolbar mount in the tripped position.

8. The apparatus of claim 1, wherein the spring assembly includes a second coil spring concentrically mounted within the first coil spring; and further including a spring bolt extending through the first and second coil springs;

a spring holder connected to the upper end of the first and second coil springs and extending downwardly about at least a portion of the coil springs;

a spring mount connected to the spring bolt and providing the pivotal mount of the spring assembly to the first pivot mount;

the springs compressing as the first pivot mount rotates from the use position to the tripped position;

the spring bolt extending through the springs during compression thereof.

9. The apparatus of claim 1, wherein the shank comprises a shank for a fertilizer applicator, the shank further including a knife at the bottom thereof to form a furrow, and a fertilizer applicator tube extending behind the shank and defining a discharge opening adjacent a rear edge of the knife.

10. A resetting mechanism for mounting a ground-engaging tool to an agricultural toolbar having a generally upright rear surface, comprising:

a shank carrying said tool;

a toolbar mount adapted to be removably mounted to said toolbar and including a guide plate engaging said rear surface of said toolbar when said mount is assembled to said toolbar, said mount further including a pair of spaced side plates engaging said toolbar and extending rearwardly and upwardly thereof;

a first pivot mount carrying said shank and pivotally mounted at a first location to said side plates of said toolbar mount for rotation from a generally horizontal use position when said tool is in a field use position to a tripped position above said use position when said tool engages an obstacle;

said guide plate including an upwardly extending opening receiving said pivot mount, said opening having an upper edge providing a limit position for said pivot mount in said tripped position;

a spring assembly including at least one pre-loaded coil spring and having a lower end pivotally mounted to said first pivot mount at a second location rearward of said first location;

a second pivot mount pivotally mounting said spring assembly to said side plates of said toolbar mount at an intermediate location of said spring assembly and such that an action line of said spring assembly extends rearwardly and upwardly of said first pivot location and wherein said guide plate prevents said action line from passing over center of said first pivot location; and a saddle member mounted between said first and second side plates of said toolbar mount and extending below said first pivot mount to limit the downward motion of said first pivot mount when said shank is in said field use position.

11. The apparatus of claim 10, wherein said action line of said spring assembly defines an included angle with the horizontal in the range of approximately 50° to 80° when said shank is in the use position.

12. The apparatus of claim 11, wherein action line of said spring assembly defines an included angle of approximately 65° with the horizontal.

13. The apparatus of claim 10, wherein said spring assembly includes a second coil spring concentrically mounted within said first coil spring; and further including a spring bolt extending through said first and second coil springs;

a spring holder connected to an upper end of said first and second coil springs and extending downwardly about at least a portion of said coil springs;

a spring mount connected to said spring bolt and providing said pivotal mount of said spring assembly to said first pivot mount;

said springs compressing as said first pivot mount rotates from said use position to said tripped position; and said spring bolt extending through said springs during compression thereof.

14. The apparatus of claim 10, wherein said shank comprises a shank for a fertilizer applicator, said shank further including a knife at the bottom thereof to form a furrow, and a fertilizer applicator tube extending behind said shank and defining a discharge opening adjacent a rear edge of said knife.

15. A resetting mechanism for mounting a ground-engaging tool to an agricultural toolbar having a generally upright rear surface, comprising:

a shank carrying said tool;

a toolbar mount adapted to be removably mounted to said toolbar and including a guide plate engaging said rear surface of said toolbar when said mount is assembled to said toolbar, said mount further including a pair of spaced side plates engaging said toolbar and extending rearwardly and upwardly thereof;

a first pivot mount carrying said shank and pivotally mounted at a first location to said side plates of said toolbar mount for rotation from a generally horizontal use position when said tool is in a field use position to a tripped position above said use position when said tool engages an obstacle;

said guide plate including an upwardly extending opening receiving said pivot mount, said opening having an upper edge providing a limit position for said pivot mount in said tripped position;

a spring assembly including at least one pre-loaded coil spring and having a lower end pivotally mounted to said first pivot mount at a second location rearward of said first location;

a second pivot mount pivotally mounting said spring assembly to said side plates of said toolbar mount at an intermediate location of said spring assembly and such that an action line of said spring assembly extends rearwardly and upwardly of said first pivot location and wherein said guide plate prevents said action line from passing over center of said first pivot location; and a transverse brace member fixed to said first and second side plates of said toolbar mount and cooperating with said upper edge of said opening in said guide plate to engage said toolbar mount in said tripped position.

* * * * *